Patented Aug. 9, 1949

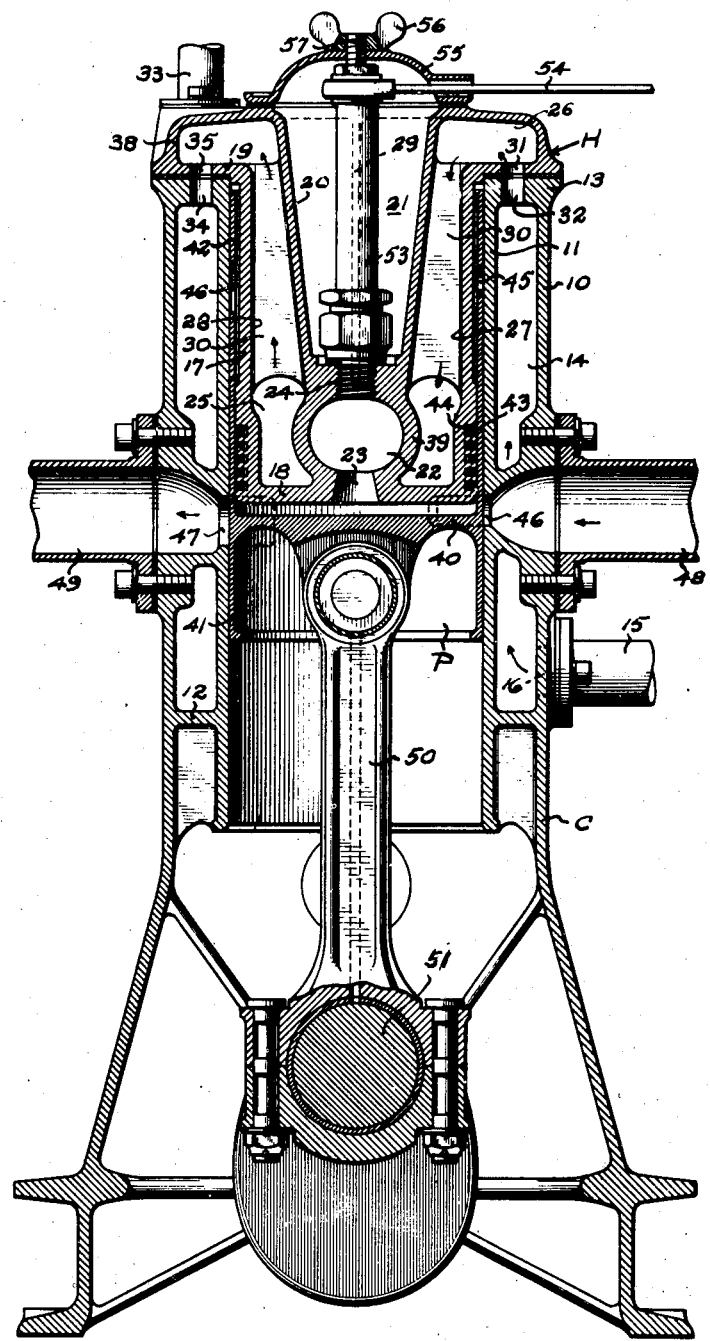

2,478,548

UNITED STATES PATENT OFFICE 2,478,548

INTERNAL-COMBUSTION ENGINE, COOLING OF CYLINDER HEAD

John E. Rovensky, Greenwich, Conn.

Application December 2, 1946, Serial No. 713,595

4 Claims. (Cl. 123—173)

This invention relates to internal combustion engine, cooling of cylinder head, and more particularly to compression-ignition engines.

An object of the invention is to provide an engine of the compression-ignition type in which a high compression ratio is obtained by a novel head and cylinder construction.

Another object of the invention is to improve the operation of a Diesel type engine through the provision of a cooling system by means of which the rate of heat transfer is satisfactorily obtained entirely around the combustion chamber.

A further object of the invention is to improve the power development and efficiency of Diesel engines.

These and other objects of the invention will be apparent to persons skilled in the art from a study of the following description and accompanying drawing.

The single figure of the drawing is a vertical sectional view of an engine incorporating the invention.

Referring now to the drawing, the cylinder C of a compression-ignition engine is formed with spaced outer and inner walls 10 and 11 joined by transverse walls 12 and 13 forming a water space or jacket 14. A suitable water circulating system is connected to the cylinder water space by a pipe 15 fixed to the outer cylinder wall 10 and communicating with inlet port 16.

A head H is suitably attached to an end of the cylinder and is formed as a hollow structure which extends across cylinder end wall 12 and projects into cylinder wall 11. The under wall of the head has a cylindrical section 17, spaced from wall 11 of the cylinder, terminating in a transverse inner wall section 18 and outer wall section 19 that overlies wall 12 of the cylinder. The upper wall of the head has an axially extending tapering section 20 forming a recess 21 that is connected by a section 39 with wall section 18 and by a top wall 38 with wall 19. Wall section 39 forms a precombustion chamber 22 that opens to the cylinder through port 23 in wall section 18 and to recess 21 through opening 24.

The space between the under and upper walls of the head forms a water jacket having a lower chamber 25 and an upper chamber 26. The upper chamber and the space there below down to the lower chamber is separated into two sections 27 and 28 by two longitudinally extending diametric baffles 29 and the space in each section between walls 20 and 17 may contain longitudinally extending baffles or walls 30. Section 27 of chamber 26 is connected with the cylinder water jacket by port 31 in wall 19 and port 32 in wall 13. Section 28 of chamber 26 is connected with a water outlet manifold 33 suitably secured on top wall 38. Water from the cylinder jacket will flow through section 27 into chamber 25 and from there through section 28 to the outlet manifold 33. Thus a part of the cooling water will circulate in a path around the precombustion chamber and the wall 18 of the head to reduce the temperature of the areas thereof subjected to the greatest heat while operating the engine. The rest of the water moved into the cylinder jacket will flow directly into section 28 of chamber 25 through ports 34 and 35 in walls 12 and 19 and from there to the outlet manifold 33. The two cooling jackets will adequately transfer heat from the head structure, the piston structure P and the cylinder walls.

Piston P is preferably a unitary structure consisting of a transverse wall 40, a depending skirt 41 and an upstanding sleeve 42 which extends into the space between the head and the inner cylinder wall. The sleeve bears against the cylinder wall in spaced relation from the head and rings 43 seated in grooves 44 in the head inner end portion bear against the sleeve. The upper end of the sleeve has an air inlet port 45 therethrough adapted to register with port 46 in the cylinder when the piston is at the bottom portion of its stroke. Sleeve port 46 is adapted to register with exhaust gas outlet port 47 in the cylinder when the piston is at the bottom portion of its stroke. The cylinder air inlet port 46 communicates with conduit 48 connected with a suitable air blower system and the cylinder exhaust port 47 is connected with an outlet conduit 49. The piston is connected by rod 50 with the crankshaft 51 of the engine in a conventional manner.

Liquid fuel is injected into the precombustion chamber through a suitable nozzle 53 secured in opening 24, the nozzle being housed in recess 21 and connected by conduit 54 with the usual system for timing delivery of the liquid fuel charges. The recess 21 is enclosed by cover 55 secured by wing nut 56 screwed on a threaded extension 57 of the nozzle.

When the piston is in the lower portion of its stroke, air will be blown into the main chamber enclosed by head wall 18, sleeve 42 and piston wall 40 for charging the space and scavenging exhaust gas. The air charge is compressed in the main chamber and in the precombustion chamber 22 on the upstroke of the piston. At a predetermined time in the piston upstroke a liquid fuel charge is injected into the compressed air in the precombustion chamber where combustion starts and spreads into the main chamber. The piston can move close to the head so that high compression ratio will result and thereby aid combustion and power development. Such high compression will of course increase the heat developed but the heat transfer arrangement will adequately cool the chamber walls.

While the invention has been described more or less in detail, it is believed that various modifications thereof will occur to those skilled in the art and all such modifications are contemplated as will come within the scope of the appended claims.

What I claim is:

1. In a compression-ignition engine, a cylinder, a head fixed on one end of the cylinder and projecting into and spaced from the cylinder, said cylinder having an air inlet port and an exhaust port therethrough adjacent the inner end of the head, a piston in the cylinder, a unitary sleeve integral with the piston projecting into the space between the head and the cylinder, and of sufficient length such that a portion thereof remains in the space during all operating conditions, said sleeve having an air intake port and an exhaust outlet port adapted to register with the similar ports in the cylinder at the bottom portion of the piston down stroke, sealing means between the head and the sleeve, and means for feeding liquid fuel into the air compressed between the piston and the inner end of the head.

2. In a compression-ignition engine, a cylinder, a head fixed on one end of the cylinder and projecting into the cylinder in spaced relation therefrom, said cylinder having an air inlet port and an exhaust port extending radially therethrough adjacent the inner end of the head, a piston, a unitary upstanding sleeve integral with the piston projecting into the space between the cylinder and the head, said sleeve bearing against the cylinder and being spaced from the head, rings on the inner end of the head engaging the piston sleeve, a precombustion chamber in the head and opening through the inner end of the head, and means for injecting liquid fuel into the chamber.

3. In a compression-ignition engine, a cylinder, a unitary head structure fixed to one end of the cylinder and projecting into the cylinder in spaced relation therefrom, said head structure being formed with a precombustion chamber opening through its inner end and with a recess extending axially above the chamber wall, a fuel injection nozzle in the recess for injecting liquid fuel into the precombustion chamber, a piston in the cylinder, and a unitary sleeve integral with the piston extending into the space between the head and the cylinder and of sufficient length to have a portion remain in the space during all operating conditions, said cylinder having inlet and outlet ports therethrough adjacent the inner end of the head and said sleeve having ports adjacent its upper end adapted to register with the cylinder ports when the piston is at the lower end of its stroke.

4. In a compression-ignition engine, a cylinder having spaced walls forming a water jacket, a head secured across one end of the cylinder and projecting therein in spaced relation from the cylinder inner wall, said head having inner and outer walls forming a water jacket with top and bottom chambers, baffle means separating the upper chamber and the jacket down to the lower chamber into separate sections, baffle means in each section between the inner and outer walls of said head, means connecting one section of the upper chamber with the cylinder water jacket, a water outlet manifold connected with the other section of the upper chamber, a precombustion chamber in the head surrounded by the lower chamber and opening through the inner end of the head, a piston in the cylinder having a sleeve in the space between the head and the inner wall of the cylinder, means for injecting liquid fuel into the precombustion chamber, and port means for admitting air into and exhaust gas from the sleeve portion of the piston.

JOHN E. ROVENSKY.

REFERENCES CITED

The following references are of record in the file of this patent:

UNITED STATES PATENTS

| Number | Name | Date |
|---|---|---|
| 1,100,166 | Williams | June 16, 1914 |
| 1,120,533 | Pottenger | Dec. 8, 1914 |
| 1,638,288 | Burtnett | Aug. 9, 1927 |
| 1,780,763 | Niven | Nov. 4, 1930 |
| 1,925,285 | Smith | Sept. 5, 1933 |
| 2,012,874 | Godsell | Aug. 27, 1935 |

FOREIGN PATENTS

| Number | Country | Date |
|---|---|---|
| 640,198 | France | 1928 |